July 20, 1943.                F. T. HARRINGTON ET AL                2,324,697
                                  POWER TRANSMISSION
                           Filed Oct. 14, 1940        5 Sheets-Sheet 4

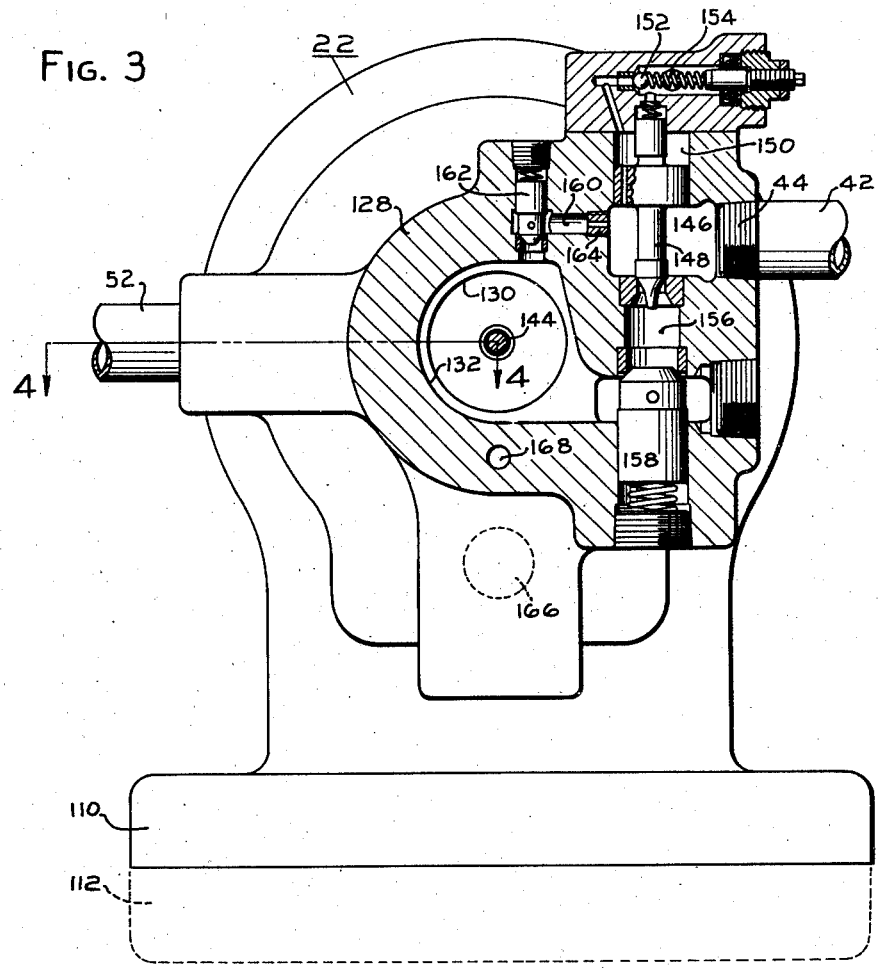
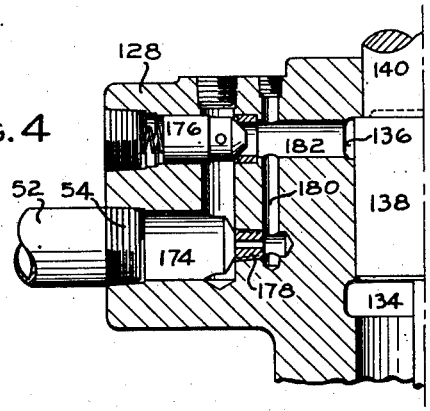

INVENTORS
FERRIS T. HARRINGTON &
RALPH L. TWEEDALE
BY  *Ralph L. Tweedale*
ATTORNEY July 20, 1943.  F. T. HARRINGTON ET AL  2,324,697
POWER TRANSMISSION
Filed Oct. 14, 1940  5 Sheets-Sheet 5

INVENTORS
FERRIS T. HARRINGTON &
RALPH L. TWEEDALE
BY
*Ralph L. Tweedale*
ATTORNEY Patented July 20, 1943

2,324,697

UNITED STATES PATENT OFFICE 2,324,697

POWER TRANSMISSION

Ferris T. Harrington and Ralph L. Tweedale, Detroit, Mich., assignors to Vickers Incorporated, Detroit, Mich., a corporation of Michigan Application October 14, 1940, Serial No. 361,116

3 Claims. (Cl. 60—97)

This invention relates to power transmissions, particularly to those of the type comprising two or more fluid pressure energy translating devices, one of which may function as a pump and another as a fluid motor.

The invention is more particularly concerned with an improved prefill valve for use in hydraulic presses and the like. It has long been common in hydraulic presses to economize on power and required pump size by performing the initial part of the pressing stroke either by gravity or by the use of small booster cylinders having a much less effective area than the main cylinder which is utilized during the final portion of the pressing stroke. A prefill valve accomplishes this by providing an open connection between the main cylinder and the tank to permit the former to fill with oil during the rapid traverse portion of the stroke. The prefill valve then closes, and pressure liquid is introduced into the main cylinder to build up the final squeeze pressure on the platen. At the conclusion of the pressing stroke when the supply pressure is directed to return the press platen, the prefill valve must again open in order to permit the return of oil from the main cylinder to the tank, since the effective area of the returning cylinder is ordinarily but a small fraction of the area of the main cylinder.

Considerable difficulty has been experienced with prefill valves in the past, particularly where the reversing control for the press consists of a four-way reverse valve. The latter is ordinarily shifted rather quickly, and shocks are encountered when the pressure in the main cylinder is suddenly relieved, since there is a tremendous amount of potential energy stored in the large volume of oil under compression and in the stressed metal parts of the press.

It is an object of the present invention to provide an improved prefill valve suitable for use in a hydraulic press wherein a unitary self-contained assembly is provided and incorporates all the mechanism necessary to provide for prefill valve operation and to control the application of pressure fluid to the main ram.

It is also an object to provide such an assembly which may be mounted on various presses in different ways either on the cylinder of the press or on the surge tank thereof or on both and which may be self-supported from its own hydraulic conduit connections.

A further object is to provide a prefill valve which serves to reduce or to eliminate completely any sudden surges or shocks encountered when the press is reversed by a quickly acting control such as a four-way valve.

Further objects and advantages of the present invention will be apparent from the following description, reference being had to the accompanying drawings wherein a preferred form of the present invention is clearly shown.

In the drawings:

Figure 3 is a cross section on line 3—3 of Figure 2.

Figure 4 is a cross section on line 4—4 of Figure 3.

Figure 1:
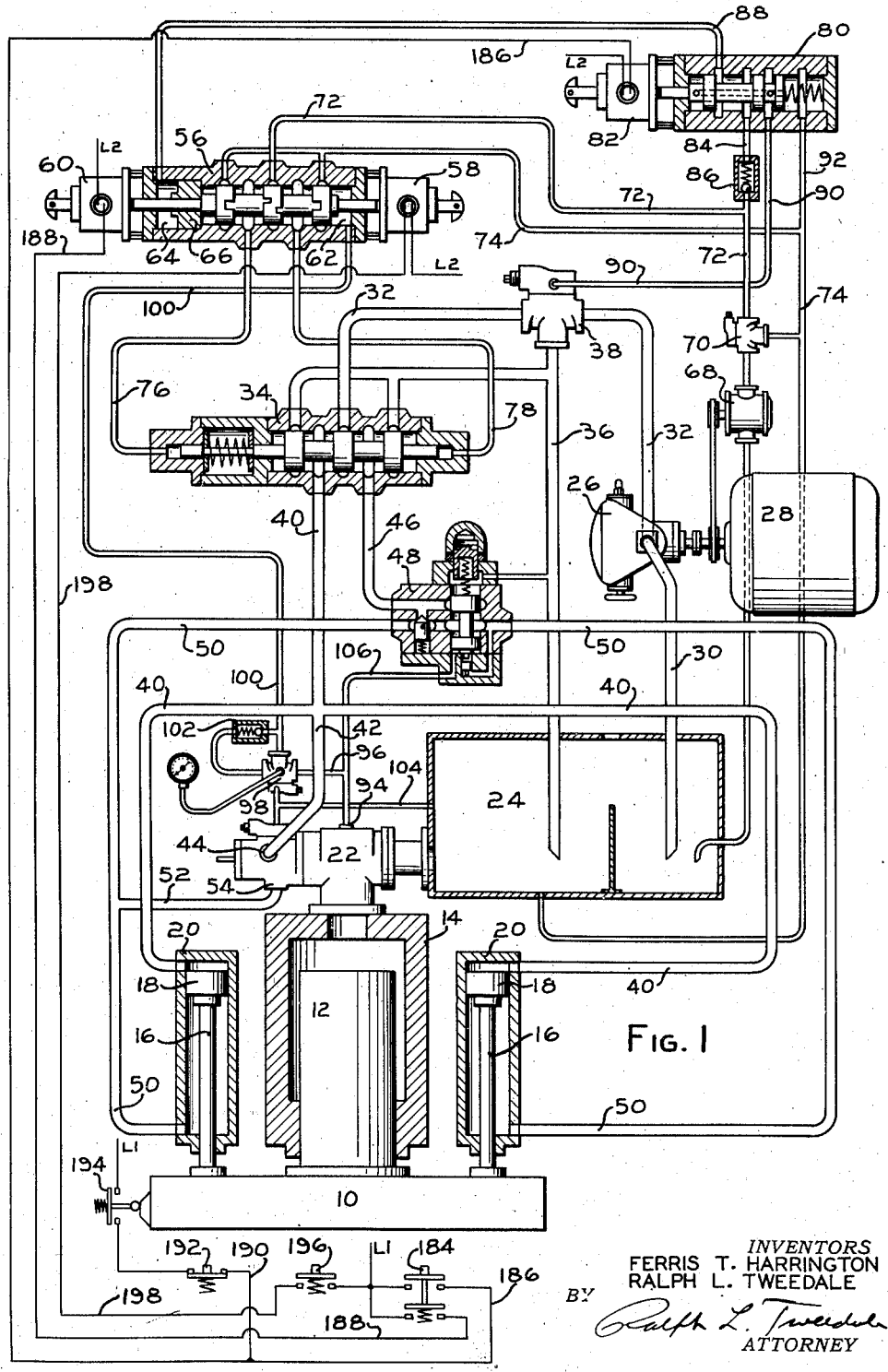
Figure 1 is a diagrammatic view of a hydraulic press circuit incorporating a preferred form of the present invention.

Figures 5 through 8, inclusive, are diagrammatic views of the circuit illustrated in Figure 1 showing the flow conditions during various stages of a complete operating cycle.

Referring now to Figure 1, the press is there indicated diagrammatically as comprising a platen 10 having a main ram 12 slidable in a main cylinder 14. Rods 16 connect between the platen 10 and pistons 18 slidable within cylinders 20. The upper ends of the latter form booster cylinders while the lower or smaller ends form the returning cylinders for the press. Mounted on top of the cylinder 14 is a surge valve 22 which is formed as an angle valve and connects with a supply tank 24.

A main pump 26, which may be of any suitable fixed or variable displacement, unidirectional delivery type, is driven by an electric motor 28 and withdraws fluid from the tank 24 through a suction conduit 30. A delivery conduit 32 extends from the pump 26 to the pressure port of a pilot-operated, spring-centered, four-way valve 34. The tank ports of the latter are connected to tank by a conduit 36. A suitable relief valve 38 may be provided in the conduit 32 and is preferably constructed in accordance with the disclosure of the patent to Harry F. Vickers, No. 2,043,453. Valves of this character may be provided with a venting port for venting the control chamber in order to permit the main valve to act as an unloading valve and by-pass the pump delivery at negligible pressure.

The lefthand cylinder port of the valve 34 connects by a conduit 40 with the upper end of cylinders 20 and also by a branch 42 with an operating port 44 of the prefill valve 22. The righthand cylinder port of valve 34 connects by a conduit 46 with a foot valve 48 and by conduit 50 to the lower end of cylinders 20. A branch 52 extends to a second operating port 54 of the prefill valve 22. The foot valve may be constructed similarly to that shown in the patent to Kenneth R. Herman, No. 2,200,824, incorporating additionally a check valve and an operating connection for admitting pressure oil to the full area of the bottom of the spool.

The spool of valve 34 is arranged to be shifted under the control of a pilot four-way valve 56, the spool of which is arranged to be shifted by solenoids 58 and 60 as well as by the admission of pilot pressure to operating chambers 62 and 64 in the ends of valve 56. The operating chamber 64 is provided with a free piston 66 of larger diameter than end chamber 62 and having a stroke sufficient to shift the spool of valve 56 from its extreme lefthand position only to its mid position.

The pressure port of valve 56 is supplied with oil from an auxiliary pump 68 driven from the motor 28 and having a customary relief valve 70 in its delivery conduit 72. The tank ports of valve 56 are connected to tank by a conduit 74. The cylinder ports of valve 56 connect by conduits 76 and 78 to the pilot operating chambers of the valve 34.

For the purpose of controlling the admission of pressure fluid to the operating chamber 64 and also for controlling the setting of relief valve 38, a solenoid-operated valve 80 is provided. In the position of the valve shown, with the solenoid 82 deenergized, pressure oil is supplied from conduit 72 by a branch conduit 84 having a check valve 86 therein to a conduit 88 leading to the operating chamber 64. In this position the valve 80 also connects a conduit 90 leading to the venting port of the valve 38 with the tank by a conduit 92. When the solenoid 82 is energized, the valve shifts to the right to connect conduit 88 with the tank conduit 92 and to connect together conduits 84 and 90.

The prefill valve 22 is provided with a pressure take-off port 94 to which a conduit 96 is connected. The port 94 is always in communication with the main cylinder 14. The conduit 96 leads to a pressure responsive relief valve 98, the discharge port of which is connected by a conduit 100 with the operating chamber 62 of valve 56. A check valve 102 is connected in parallel with the relief valve 98 to form a free path for oil returning from the chamber 62. A tank return line 104 connects with the drain port of valve 98 and also with a similar drain port provided at the valve 22. The conduit 96 has a branch 106 leading to the foot valve 48 for the purpose of opening the same wide whenever pressure exists in the main cylinder 14.

Figure 2:
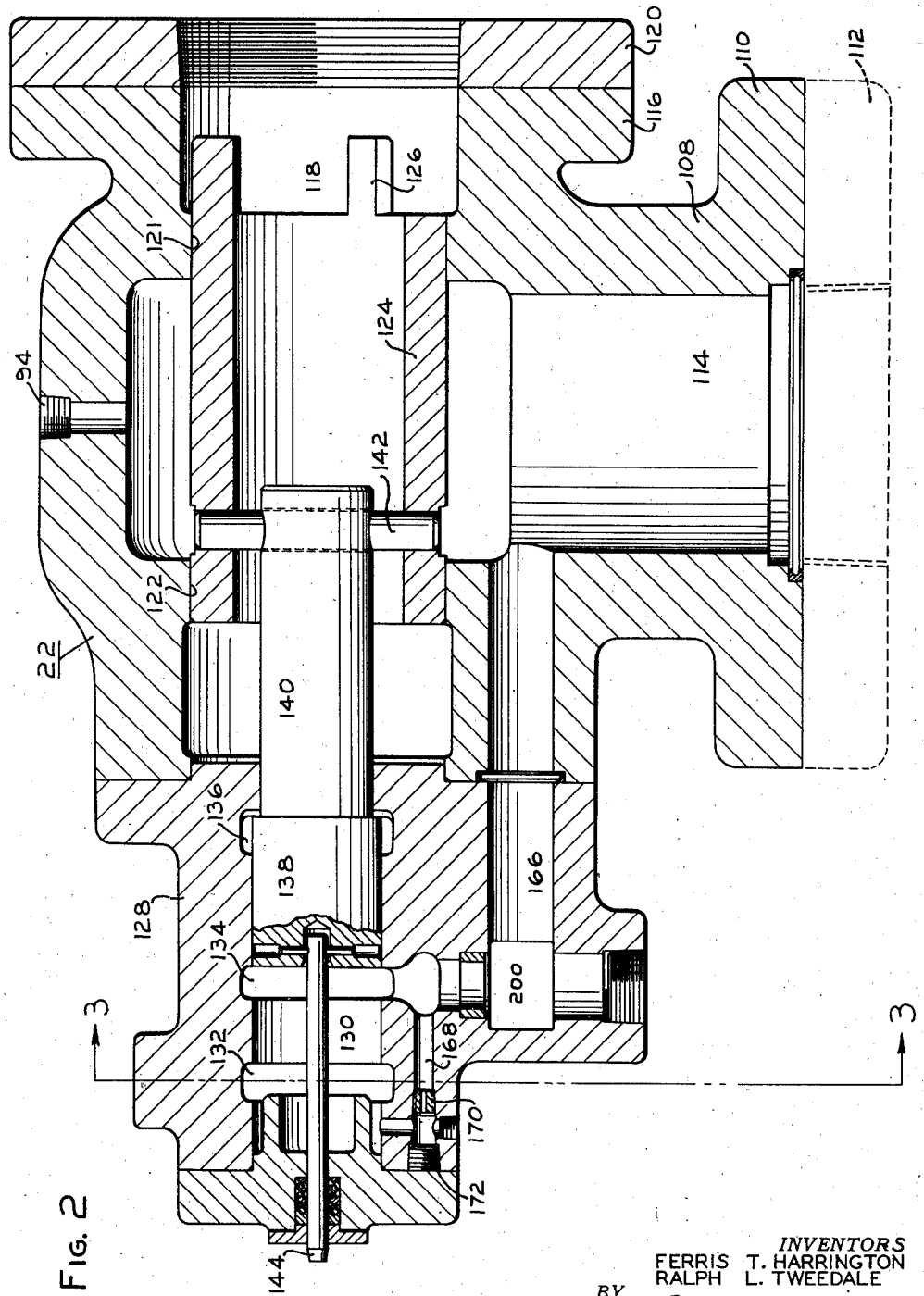
Figure 2 is a longitudinal cross section of an improved prefill valve constructed in accordance with the present invention.

Referring now to Figures 2 through 4, the internal construction of the prefill valve 22 is there illustrated. The main valve comprises an angle body 108 having a flange 110 for mounting by suitable bolts on the main cylinder 14. Alternatively, the flange 110 may carry a pipe flange 112 shown in dotted lines whereby the valve may be connected to the main cylinder by a pipe connection when the valve is not supported by the main cylinder. The flange 110 is provided with a main cylinder port 114. At right angles to the flange 110 there is provided a flange 116 which forms a tank port 118 and which may be secured to the tank by suitable bolts, not shown, or may carry a pipe flange 120 for connection to a suitable pipe leading to the tank. Both the flanges 110 and 116 are made with sufficient strength to provide support for the full weight of the valve from either flange. Thus the valve may be mounted directly on the cylinder and connected by a pipe to the tank or may be mounted directly on the tank and connected by a pipe to the cylinder. Alternatively, in cases where the tank is mounted directly on top of the cylinder, the valve may be mounted inside of the tank, and the flange 110 bolted directly to the bottom of the tank in which a perforation is provided in register with the port 114. In such cases port 118 opens directly into the body of oil in the tank.

Coaxial with the port 118 there are provided two bores 121 and 122 in which is slidable a tubular valve element 124 which forms the main prefill valve. The sleeve 124 is provided with three or more projections 126 at its righthand end forming guiding supports for the sleeve in the bore 121 when the sleeve is fully retracted to the left.

For the purpose of shifting the sleeve 124, an operating mechanism is provided comprising a body member 128 bolted to the member 108 in alignment with bore 122 at the lefthand end thereof. The member 128 is provided with a main operating cylinder 130 having three annular recesses 132, 134 and 136 disposed along its length. Slidably mounted in the cylinder 130 is a differential-area piston 138, the rod 140 of which projects through the end wall of the cylinder 130 and is connected to the sleeve 124 by a pin connection 142. The lefthand end of piston 138 carries a tell-tale rod 144 which projects to the outside of the member 128 through a packed opening.

Referring now to Figure 3, the operating port 44 connects to the pressure chamber 146 of a pilot-operated balanced relief valve 148 of the type shown in the previously mentioned Vickers patent. Its control chamber 150 is connected with a pilot relief valve 152 which exhausts through a port 154 to the tank return line 104. The relief valve 148 is thus externally drained in lieu of being drained through a central passage down through the bottom of the valve member. The exhaust port 156 of the valve 148 leads to a check valve 158, the outlet side of which communicates with the recess 132. The valve 148 thus acts as a pressure responsive valve to close communication between port 44 and recess 132 until the pressure in chamber 146 builds up to a predetermined value depending upon the setting of the spring-loaded valve 152. Check valve 158, of course, permits flow through the valve 148 in one direction only.

As a bypass around the valve 148 there is provided a conduit 160 having a check valve 162 opening in the direction opposite to that of check valve 158. The conduit 160 is also provided with a resistance plug 164 forming a restricted path for flow out of the righthand end of bore 130 to the port 44. The plug 164 may be interchanged with plugs of different resistance by removing conduit 42 from port 44 for access to the plug.

Referring now again to Figure 2, the port 134 is connected by an angle passage 166 formed in the members 128 and 108 with the main cylinder port 114. A branch passage 168 having a restrictor plug 170 therein connects between port 132 and port 134. The plug 170 is preferably arranged to be interchangeable with plugs of different resistance by removing the closed plug 172 at the left-hand end of passage 168.

Referring now to Figure 4, the port 54 connects by a passage 174 with the outlet side of a check valve 176. The passage 174 also communicates by an interchangeable restrictor plug 178 and a passage 180 with a passage 182 leading to the port 136. The check valve 176 thus permits free flow from the righthand end of cylinder 130 (in Figure 2) to the port 54 while the restrictor 178 permits only a restricted flow in the opposite direction.

With the parts in the position illustrated in Figure 1, in which prefill valve 22 is open from the tank to the main cylinder 14, the delivery of pump 26 is bypassed through the open relief valve 38 which in turn has its control chamber vented to tank through conduit 90, valve 80 and conduit 92. Thus no pressure is supplied to the main circuit 40—46.

In order to start an automatic cycle of pressing operation, the solenoids 60 and 82 must be energized. For this purpose an electrical control circuit consisting of a two-circuit, momentary-contact, starting switch 184 may be provided for closing a circuit extending from line L¹ by a conductor 186 to the solenoid 82 and a second circuit extending from line L¹ by a conductor 188 to the solenoid 60. The opposite sides of all solenoids are connected to line L².

In parallel with the switch 184 as regards the conductor 186 is a circuit 190 having a normally-closed, momentarily-open, stop switch 192 therein and a normally-closed limit switch 194 arranged to be opened when the platen 10 is at the upper limit of its stroke.

It will be seen that, when the starting switch 184 is depressed, solenoids 60 and 82 are energized, and as soon as the platen 10 starts downwardly, switch 194 is closed to hold the solenoid 82 energized. After this has occurred, the switch 184 may be released, thus deenergizing solenoid 60 without, however, shifting the valve 56. An emergency return switch 196 is arranged when closed to connect line L¹ with a conductor 198 leading to the solenoid 58.

Figure 5:
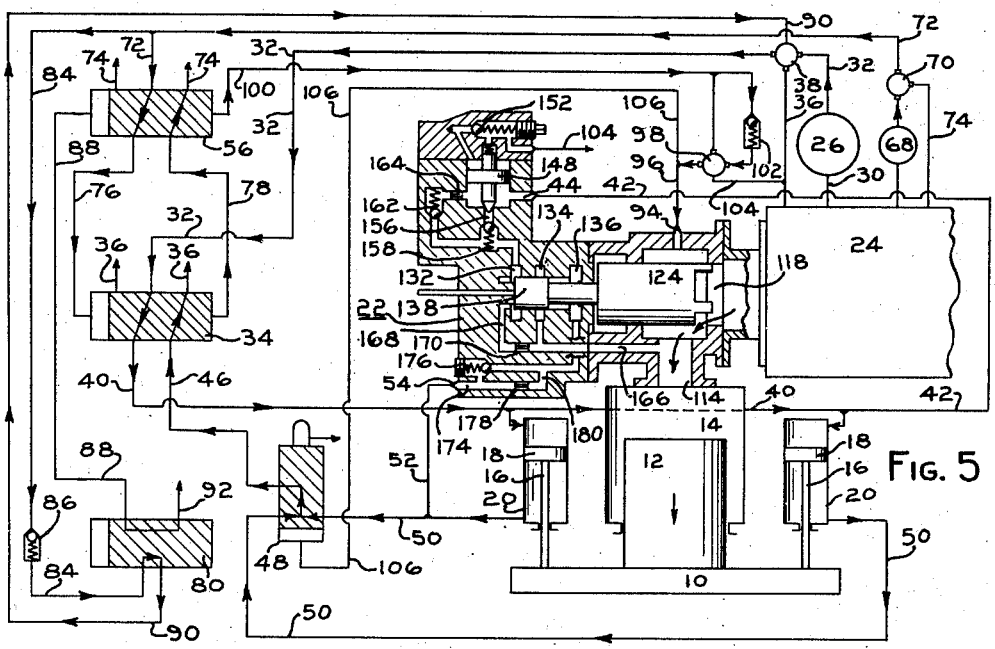

When the solenoids 60 and 82 have been energized by closure of the starting switch 184, the spool of valves 56 and 80 shift to the right to establish flow conditions as illustrated in Figure 5. The vent of valve 38 is closed by the valve 80 and connected to the supply line 72 from pump 68. Check valve 86 is effective to prevent flow from conduit 90 to conduit 72, however, in the event that the auxiliary pump pressure is lower than the pressure in delivery conduit 32. Shifting of valve 80 also connected operating chamber 64 of valve 56 to tank through conduits 88 and 92.

The shifting of valve 56 admits pressure oil from conduit 72 to conduit 76, thus shifting the main four-way valve 34 to the right and admitting pressure oil from conduit 32 to conduit 40 and the booster cylinders 20. This pressure is also applied to the prefill valve operating mechanism at port 44 but is prevented from reaching the recess 132 by the valve 148 and the check valve 162. The press platen 10 accordingly moves downwardly under the pressure applied to the booster cylinders, and the main ram fills from the tank 24 through the prefill valve. Oil discharged from the return cylinders passes through conduit 50, and, after building up sufficient pressure to open foot valve 48, passes through conduit 46, valve 34 and conduit 36 to the tank.

Figure 6:
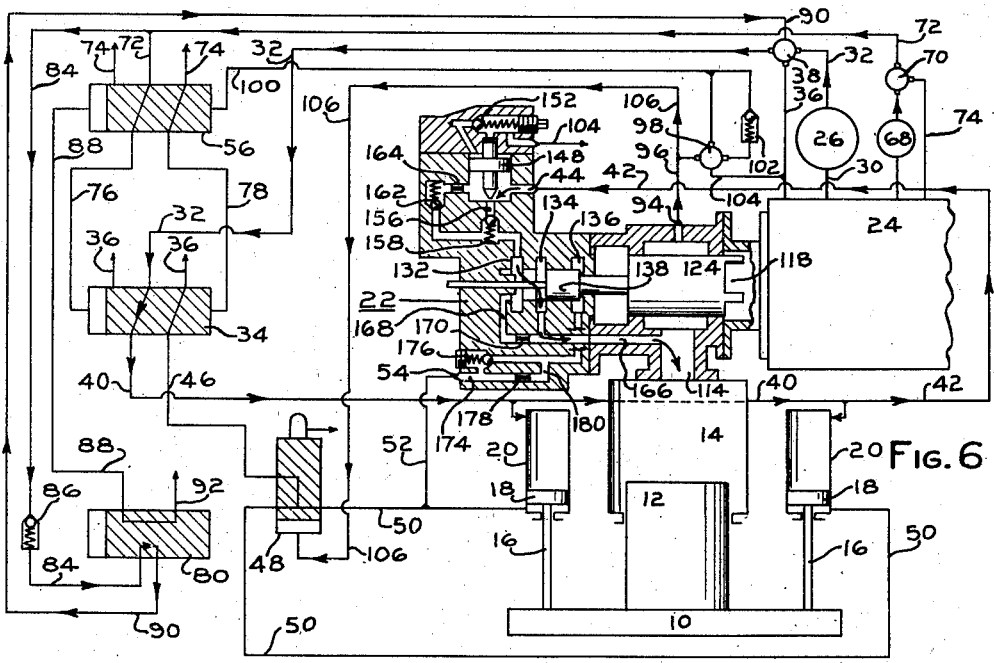

When the platen meets the work, pressure builds up in the booster cylinders 20 and in port 44 to the point where valve 148 opens. The flow conditions at this time are illustrated in Figure 6. Pressure oil is accordingly admitted through chamber 156 and check valve 158 to the recess 132 where it acts on the lefthand end of piston 138 in Figure 2. The latter accordingly shifts to the right closing the prefill valve 124 and at the same time opening a connection between recesses 132 and 134. Pressure oil which was formerly directed only to the booster cylinders is now directed also to the main cylinder through passage 166 and port 114. Thus the pressing stroke is completed utilizing the full area of the main cylinder plus that of the booster cylinders. In addition, to further increase the tonnage of the press, the pressure in main cylinder 14 is directed from port 94 through conduit 106 to the foot valve 48 where it reacts over the full spool area at the lower end thereof to open the valve wide and impose no resistance to oil returning from the return cylinders.

Figure 7:
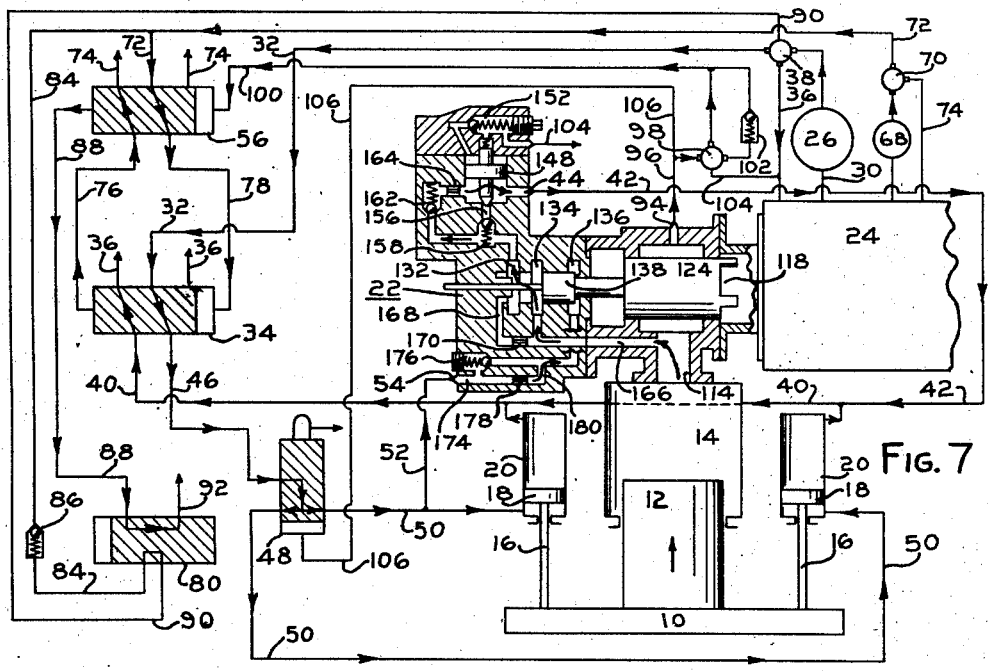

When the pressure on the main ram is built up to the setting of the relief valve 98, the latter opens admitting oil through conduits 96 and 100 to the operating chamber 62 at the righthand end of valve 56. It being remembered that solenoid 60 was deenergized as soon as the starting switch was released, it will be seen that this pressure oil shifts the spool of valve 56 to its extreme lefthand position, as illustrated in Figure 7. The conditions there illustrated are somewhat momentary but, nevertheless, very important of consideration.

At the completion of the pressing stroke, the main cylinder 14 and the booster cylinders 20 were filled with oil under high pressure so that this large volume of oil was compressed to a certain degree, and the cylinders themselves were dilated and also the frame of the press was somewhat stretched. These forces together represent a considerable amount of stored energy which must be relieved before the return movement of the press can begin. This energy is relieved by bleeding the pressure oil from cylinder 14 through port 114, passage 166, recesses 134 and 132, check valve 162, passage 160, restrictor 164, chamber 146, port 44, and conduits 42 and 40 to the lefthand cylinder port of valve 34. The latter having been shifted to its extreme lefthand position by the shifting of pilot valve 56, the lefthand cylinder port is now connected to tank through conduit 36.

Figure 8:
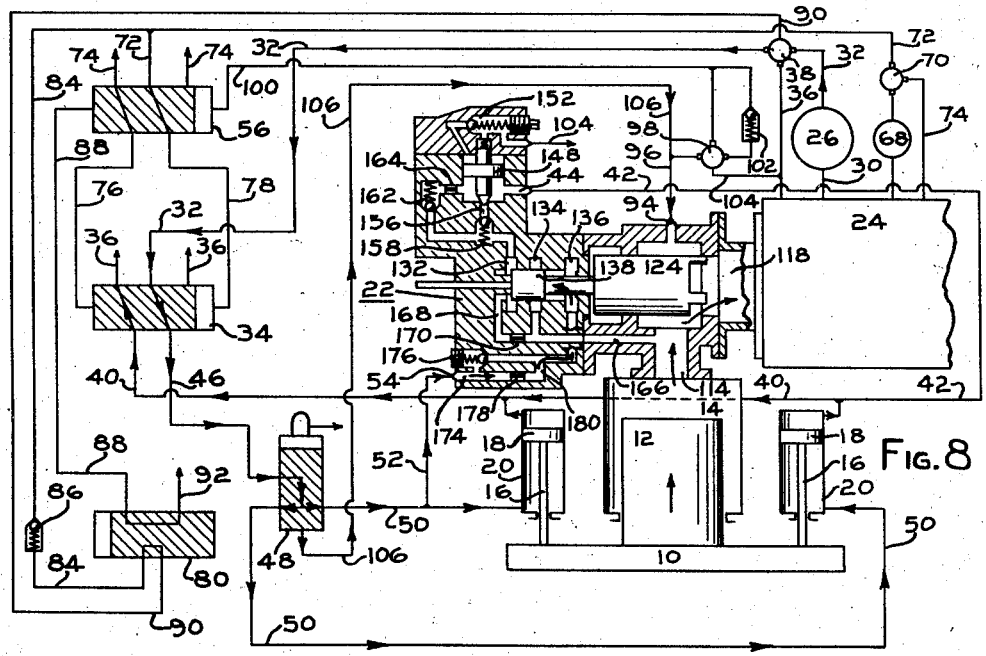

While this stored energy is being thus relieved, the main prefill valve 124 is stationary. This is due to the fact that the pressure oil applied from conduit 32 through valve 34 and conduits 46 and 50 to the returning ram and through conduit 52, port 54, passage 174, restrictor 178, and passages 180 and 182 to the recess 136 acts on the small area of piston 138. Opposing this pressure is the pressure in the main cylinder acting on the lefthand face of piston 138 which is several times larger. Accordingly, until the pressure in the main cylinder falls to a predetermined fraction of the pressure built up in the returning cylinders, the valve 124 remains stationary. When this point is reached, however, the piston 138 will be shifted to the left thus again opening the connection between main cylinder 14 and tank 24. These conditions are illustrated in Figure 8.

The press accordingly returns upwardly until the limit switch 194 is again opened which deenergizes the solenoid 82. The spool of valve 80 accordingly shifts to the left returning the parts to the position illustrated in Figure 1.

At any time during the cycle the press may be either stopped or reversed by operation of the switches 192 and 196, respectively.

Switch 192 when opened deenergizes solenoid 82 thereby stopping the platen in the same manner as when switch 194 is opened. Switch 196 when closed energizes solenoid 58 which shifts the spool of valve 56 to its extreme lefthand position in the same manner as is done by admission of pressure oil to chamber 62.

A feature of the present valve lies in the provision of passage 168 and restrictor 170 which insure that the valve sleeve 124 remains fully open during the initial part of the pressing stroke. Should there be leakage past valves 148 or 162 at any normally possible rate, it is free to pass out through restrictor 170 so that a gradual shifting of piston 138 to the right is avoided. In addition there is usually a slight suction in the main cylinder during the prefill stroke due to the resistance which valve 124 imposes to the large volume of flow taking place therethrough. This suction is transmitted through restrictor 170 to act on the left face of piston 138 and thus assists in maintaining the prefill valve open. At this time, of course, the back pressure created by foot valve 48 in lines 50 and 52 is transmitted to the righthand face of piston 138 but this area is rather small, so that the suction acting on the left face materially aids in keeping the valve wide open during the prefill stroke.

Another feature of the present valve resides in its adaptability to a wide variety of press designs and press operating cycles. In applying the valve to some types of presses it is found desirable to utilize a lower pressure in the main ram during the main pressing stroke than exists in the booster rams during the prefill part of the stroke. The provision of the relief valve 98 communicating through port 94 and conduit 96 directly with the main ram cylinder permits such operation by adjusting the relief valve 98 to open at a lower pressure than the sequence valve 148 is set to open at. In cases where the automatic reversal of the press by pressure build-up on the main ram is not desired, the conduit 100 may then be connected directly to tank instead of to the end chamber 62 of the reverse valve 56.

Another possible use of the present valve with a different type of press concerns its use with hot plate or other curing presses where it is necessary to maintain pressure on the ram for a considerable period after the press has closed. In such instances, the check valve 158 may be moved from the position illustrated in Figure 3 to the bore indicated at 200 in Figure 2. This then acts as a safety check valve to hold pressure in the main ram in the event of loss of pressure in the pump line due to power failure or other derangement. Such a modification, of course, eliminates the delayed opening of the valve 124 at reversal, and for this purpose the righthand end of the sleeve 124 may be tapered or a few small holes drilled in the same to provide gradual release of the main ram pressure.

While the form of embodiment of the invention as herein disclosed constitutes a preferred form, it is to be understood that other forms might be adopted, all coming within the scope of the claims which follows.

What is claimed is as follows:

1. A prefill valve assembly for hydraulic presses of the type having main, booster and return cylinders, a supply tank, and means for selectively supplying pressure fluid to the booster cylinder or the return cylinder, said assembly comprising a housing having main ports connected respectively with the tank and with the main cylinder, a shiftable valve for selectively opening or closing communication between said ports, a double-acting differential piston and cylinder for shifting said valve and having its larger area effective to close the valve, a first passage communicating between the booster cylinder and the larger area of said differential cylinder, a second passage communicating between the return cylinder and the smaller area of said differential cylinder, a pressure responsive valve in the first passage for preventing admission of fluid to the larger area of said differential cylinder until a predetermined pressure has built up on the booster cylinder, a restricted bypass directly around said pressure responsive valve, said bypass including a check valve opening away from the larger area of said differential cylinder, and means associated with said shiftable valve for opening communication between the booster cylinder and the main cylinder when the valve is closed.

2. A prefill valve assembly for hydraulic presses of the type having main, booster and return cylinders, a supply tank, and means for selectively supplying pressure fluid to the booster cylinder or the return cylinder, said assembly comprising a housing having main ports connected respectively with the tank and with the main cylinder, a shiftable valve for selectively opening or closing communication between said ports, hydraulic means for shifting the valve to closed position, means for shifting the valve to open position, a connection providing separate paths for flow in each direction between said hydraulic means and the booster cylinder, a pressure responsive valve in one path for delaying the closing of the valve until a predetermined pressure is reached at the booster cylinder, and means providing permanently open restricted communication between said hydraulic means and the main cylinder, whereby reasonable leakage at said pressure responsive valve is ineffective to shift the valve.

3. A prefill valve assembly for hydraulic presses of the type having main, booster and return cylinders, a supply tank, and means for selectively supplying pressure fluid to the booster cylinder or the return cylinder, said assembly comprising a housing having main ports connected respectively with the tank and with the main cylinder, a shiftable valve for selectively opening or closing communication between said ports, a double-acting piston and cylinder for shifting said valve, a first passage communicating between the booster cylinder and the valve-closing side of said piston, a second passage communicating between the return cylinder and the valve-opening side of the piston, means including a port opened when the valve is closed for placing the main cylinder in communication with the booster cylinder and the valve-closing side of the piston, a pressure responsive valve in the first passage for preventing admission of fluid to the valve-closing side of said piston until a predetermined pressure has built up on the booster cylinder, and a restricted bypass directly around said pressure responsive valve, said bypass including a check valve opening out of the valve-closing side of said piston and forming, at the time of reversal of the press, a means for relieving compressed liquid in the main cylinder whereby, until such liquid is substantially relieved, the valve-closing side of the piston will be exposed to main cylinder pressure and the prefill valve will be prevented from opening.

FERRIS T. HARRINGTON.
RALPH L. TWEEDALE.